Patented May 14, 1935

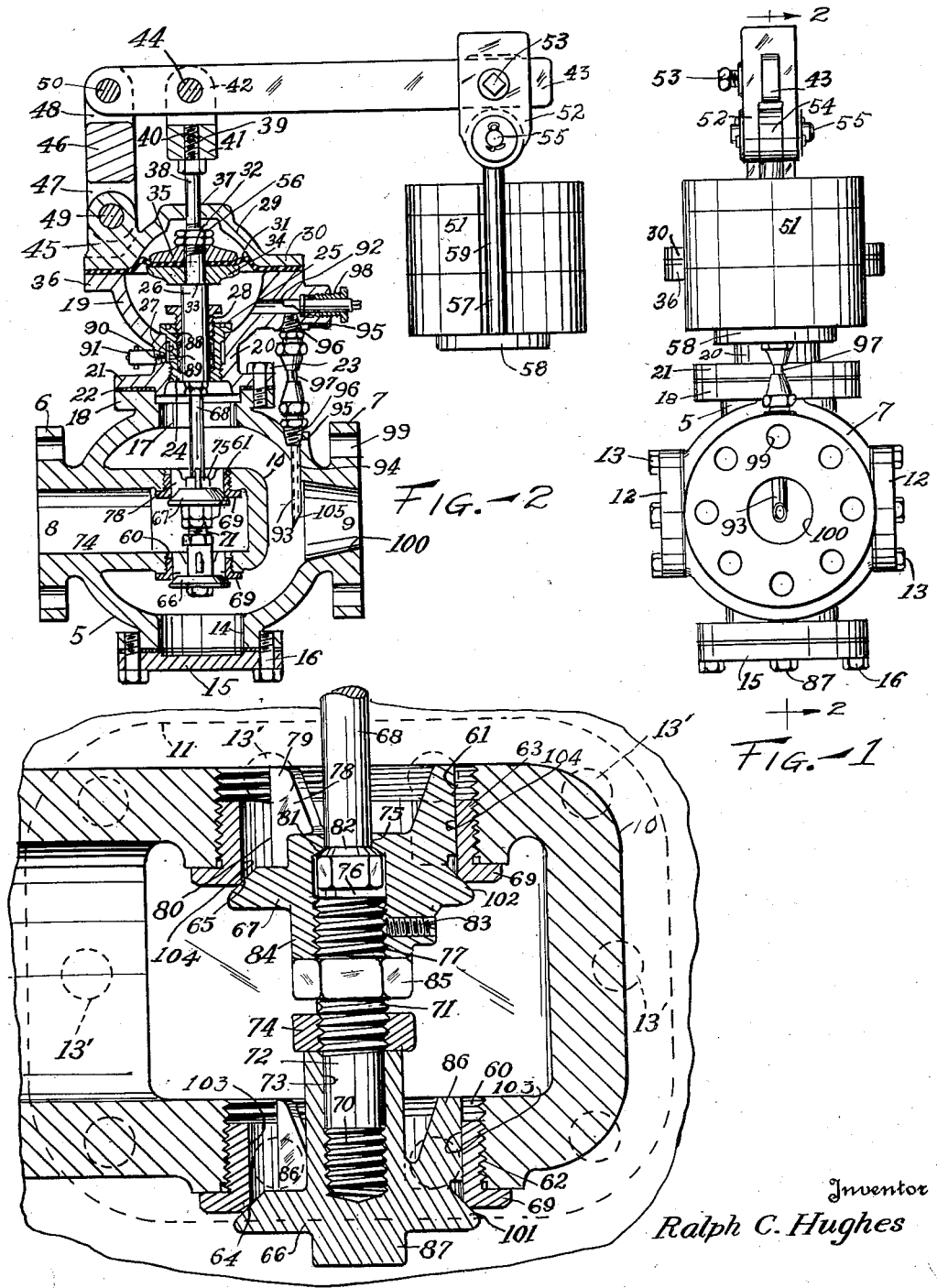

2,001,534

UNITED STATES PATENT OFFICE 2,001,534

FLUID PRESSURE REGULATOR

Ralph C. Hughes, Anderson, Ind., assignor to Reynolds Gas Regulator Co., Anderson, Ind., a corporation of Indiana Application January 29, 1932, Serial No. 589,663

2 Claims. (Cl. 50—27)

This invention relates to fluid pressure regulators, and more particularly to improvements in pressure regulators especially adapted for maintaining substantially uniform pressure in gas service pipes regardless of the consumption, and wholly automatic in its action.

This invention has for an object to provide a pressure regulator of the type including an inlet and outlet valve casing protecting therein a valve seated and controlled by the force of a diaphragm which is responsive to pressure on the outlet side of the regulator as well as to that existing in the inlet main leading into said casing. The character of valve to be used in this improved regulator will be that of the general type of Reynolds regulator disclosed in the U. S. Patent to Reynolds No. 843,174, Feb. 5, 1907.

A further object of this invention is to provide a main reducing valve of the general type shown in said patent and which has special provision for adjustment of its sections on the stem.

It is a further object of this invention to provide a reduction valve mounted in a valve casing and having the bridge wall partition type of seating, but which shall include adjustable mounting of the valve seats on such partition and adjustable mounting of the valve plates on the axially movable valve stem, as well as both lateral hand openings in said casing and bottom hand opening therein directly beneath the said valve seats, to make particularly practicable adjustment of the valve seats and valve plates, both relative to each other and to said partition wall openings, without dismantling the casing relative to the mains or to the regulator elements for the valve.

Other and further objects and advantages of the invention will be hereinafter set forth in the annexed specification, recited in the appended claims, and illustrated in the accompanying drawing, in which—

Figure 1 is an end elevational view of the improved regulator in a preferred form and looking toward the outlet from the valve casing;

Figure 2 is a vertical sectional view of the valve and related parts, the section being shown in the plane indicated by the line 2—2 of Fig. 1, and Figure 3 is a section similar to that shown in Fig. 2, but limited to details of the reduction valve parts and their mounting, and shown in an enlarged scale.

In the drawing I have designated the main valve casing by the numeral 5 which it will be understood is provided with the usual apertured flanges 6 and 7 for connection with the inlet and outlet mains, not shown, but designed to register with the openings 8 and 9 respectively. This casing has mounted therein bridge wall partition 10 integral with the casing.

To enable practical mounting of the valve parts in a large number of adjusted sections to secure very delicate adjustment of the various sections relative to the fixed metal wall having the registering apertures in which the valve parts are to be mounted, it is quite essential to provide the wall of the valve casing with alined lateral openings 11 in axial alinement with the space intermediate the said wall apertures to permit manual insertion into casing 5 for the purpose of the more than usual accuracy of adjustment which this valve is designed to permit. Cover plates 12 are secured in position detachably over said openings 11 by bolts 13 in apertures 13' of casing and plates.

An opening 14 below the valve is provided in the bottom of the casing 5 and will be detachably covered by the plate 15 by suitable bolts 16. In axial alinement with the opening 14, the casing is provided with an upper opening 17 directly above the valve apertures, and the casing is provided with an integral annular flange 18 about said opening 17. Axially above and upon said annular flange I mount a diaphragm casing formed of detachable sections to provide the usual bowl, whose lower section 19 is integral with the downwardly extending sleeve 20, which latter is integral with a flange 21 corresponding in outline to flange 18 between which flanges a suitable gasket 22 is provided, and the parts secured detachably by bolts 23.

In the throat 24 of the sleeve 20 there is mounted a tubular guide plug 25 made up of telescopic tubular sections adjustable co-axially and providing between them a stuffing box as well as affording a composite guiding means for the valve stem 26. The main section 27 of this tubular plug 25 is externally threaded for close fitting in said throat 24, and the upper portion of such main section is internally threaded to receive adjustably therein the threaded tubular inner section 28 having a cap of non-circular outline for rotation by a suitable tool.

Upon the lower section 19 the upper section 29 of said diaphragm casing is mounted peripherally, the flanges 30 of the upper section 29 resting upon the flange 36 with the peripheral edge of the diaphragm 31 being secured between the flanges of the two sections, as indicated in Fig. 2 of the drawing. The said diaphragm is centrally apertured to receive therethrough a reduced portion 32 of the stem 26, thereby providing a shoulder 33 upon which the apertured plate 34 beneath the diaphragm rests, and a corresponding upper plate 35 having a similar aperture is mounted upon the stem portion 32, the two plates 34 and 35 engaging the diaphragm 31 between them, and a pair of threaded nuts 56 are tightened down upon the upper plate. The casing section 29 is centrally apertured at 37 to receive therethrough a further reduced end 38 of the stem 26, and such reduced end is externally threaded at 39 to be rotatably secured in the axially threaded aperture 40 of the pivot block 41 having a bifurcated upper end 42 to which the lever bar 43 is pivoted intermediate its ends by a cross pin 44.

Upon a peripheral lug 45 integral with the casing section 29 a link 46 having bifurcated ends 47 and 48 will be pivoted by a cross pin 49 inserted in apertures of said lugs and the lower ends 47; while one end of the lever bar 43 will be pivoted to the upper ends 48 of the link by the cross pin 50. A suitable weight 51 will be adjustably positioned for suspension from the opposite end of said bar 43, by the provision of a yoke 52 slidable on said bar and adjustably secured at the desired position thereon by means of a transverse bolt 53 which may be adjusted by suitable tool to clamp the bar as needed. The lower end of the yoke is bifurcated to receive therein a flattened head 54 detachable by a cross pin 55, the head having a main stem portion 59 extending through a central opening 57 in the weight and having an integral lower plate 58 for supporting the weight thereon.

The alined openings 14 and 17 of the valve casing 5 are also in alinement with apertures 60 and 61 in the walls of the partition 10, such apertures being alined with the said openings in the valve casing 5 to accommodate suitable mounting of the valve seats for relative adjustment intermediate the casing openings 14 and 17. Linings for such wall partition apertures are provided as flanged sleeve-like and externally threaded cylinders 62 and 63 designed to enter the internally threaded openings or apertures 60 and 61, respectively, the linings themselves providing the valve seats 64 and 65 against which valve members 66 and 67 carried by the extension 68, will engage when the valve closes.

The cylinders 62 and 63 are flanged at 69 to limit the upward adjustment of these lining elements in the wall apertures of the partition 10, and the extension member 68 of the stem 26 carries on its lower end a separate extension member 71 which is externally threaded at its lower end 70 and also at its upper end, the two threaded portions being spaced apart by a smooth circumferential portion 72, the member 66 having an axial socket 73 of sufficient size to receive the portions 70 and 72 of the extension 71, the lower portion of the socket 73 being internally threaded for engagement by the threaded end 70 of extension 71, and the upper portion of the socket having a smooth inner surface normally adjacent the smooth surface 72 of the extension 71.

A threaded nut 74 will adjustably engage the threads of the extension 71 and thereby hold the valve member 66 in relative position on said extension. The valve member 67 differs in form from the member 66 by having an axial aperture extending through the entire length thereof, having a smooth portion 75 through which the extension 68 extends downwardly, an enlarged axial portion 76 beneath said aperture, and an internally threaded portion 77 for engaging the upper threaded portion of the extension 71.

The valve member 67 has at its upper portion, integral wing extensions 78 whose upper portions 79 are spaced circumferentially from each other and have outer parallel edges 80 movable contiguous with the inner surface of the liner sleeves 63, as shown in Fig. 3. These wings 78 serve as guide elements in adjusting the valve member 67 on the extension 71, and within the liner 63 in operation of the valve. The enlarged opening 76 is shaped lengthwise as a cylinder having an upper frusto-conical portion 81 to receive a correspondingly shaped enlargement 82 on the extension 68. A radial screw 83 is provided in said valve member for locking the latter in adjustment on the threaded end of the extension 71. The parts 76 and 82 permit relative movement. The lower portion of the valve member 67 is made hexagonal at 84 for actuation by suitable tool, and a lock nut 85 for engaging the threaded portion of the extension 71, will lock the member in adjusted position. The two nuts 74 and 85 are sufficiently spaced to adjust the members 66 and 67 on the extension 71 as desired. The lower member 66 is also provided with integral and upwardly extending wing extensions 86 circumferentially spaced and otherwise positioned within the sleeve lining 62 in much the same manner as the wings 78 are guided within the lining 63. A downwardly extending portion 87 of the valve member 66 is also hexagonal for engagement by suitable tool.

Outside communication through the sleeve 20 with the stuffing box 88 within the sections of the guide plug 25, is afforded by a radial aperture 89 leading outward to an internally threaded socket 90 adapted to receive a removable plug 91 having an externally threaded end fitting said socket 90. Communication is afforded between the interior of the valve casing on the outlet side of the reducing valve 66—67 and the lower section 19 of the diaphragm casing beneath the diaphragm 31, by providing the casing section 19 with a radial aperture 92 and connection therewith, to be later described.

Connection between the interior of the valve casing 5 and the diaphragm casing section 19 is provided by inserting a vertical tubular stem 93 down through an aperture 94 in casing 5 to a point in the larger end of the outlet 9, while spaced at a maximum distance from partition part 10, whereby a maximum suction force will be exerted through the part 97 of the tube and to relieve the pressure beneath the diaphragm 31, as before explained, and providing frusto-conical sockets which are internally threaded at 95 and leading to the said apertures 92 and 94, respectively, for receiving in said sockets externally threaded hollow plugs 96 adjustably connected together by the tubular element.

A radially positioned plug and socket connection 98 is provided at the outer end of the aperture 92, to afford means for direct outer connection with the lower chamber of the diaphragm casing when needed. Means for attachment of inlet and outlet mains to the main casing 5 is afforded by the flange structures 6 and 7 having the apertures 99 for receiving securing bolts, the outlet opening 9 is frusto-conical in form and has its smaller opening and outer end 100 of substantially the same radius as the cylindrical inlet opening 8, and the lower end of the tubular stem 93 is in alinement with the axis of the frusto-conical opening 9, and at the center of the large base of said opening, the stem opening being oblique at 105, as shown in Figs. 1 and 2.

In operation, the composite valve members 66 and 67 will be adjusted upon the extension 71 of the stem 26, so that the frusto-conical portions 101 and 102 of the respective valve members will be separated by a distance substantially identical with the space between the valve seats 64 and 65 on the linings 62 and 63. Such adjustment can by my structure be made very delicate and accurate, by rotation of the said members by engagement of the hexagonal portions 87 and 84 by a suitable tool. The plug 83 will then be screwed down tight against the extension 71, and the nut 85 rotated to engage tightly the lower edge of the part 67. The nut 74 will be correspondingly tightened upon the threaded element 71, though moved in an opposite direction against the member 66. The valve members will thus be actuated together by movement of the extension 71.

The internal surfaces of the linings 62 and 63 are smooth as indicated at 103 and 104 respectively, and are especially serviceable by contact of the wing extensions 78 and 86 thereagainst, as the valve members 66 and 67 are actuated longitudinally on the common extension 71 of the stem 26 while these wing members 78 and 86 are integral with their respective valve members, it is an advantage that they are spaced from each other circumferentially, and thus present a minimum surface contact with the linings, and will permit a slight yielding movement by bending, if undue tension should require.

It is to be noted that the smaller end 100 of the outlet opening 9 is the outer end and that the larger and inner end of that opening is closely adjacent the tubular stem 93, the end of the latter stem being at the center of the inner and larger end of the opening 9. It is also noted that the lower end of said stem is fashioned oblique and that such end 105 faces toward the opening 9, all of which related parts just described tend to accentuate the effect of increased demand in the outlet main and in said opening, whereby the diaphragm 31 is further urged responsive to decreased pressure therebeneath, due to communication between the stem 93 and the aperture 92 in the wall of section 19, to permit opening the valve members 66—67 to relieve such low pressure.

Outward flow through the opening 9 will have the above stated effect normally, by reason of the central position of the end 105 of the stem 93 within the valve casing 5 at the axis of and adjacent the inner end of the outlet opening 9, but this effect will be enhanced by the frusto-conical form of the latter as well shown in Fig. 2. The form of this opening as explained, is that having the smaller and outer end 100 of a size substantially that of the inlet opening 8, and the larger and inner end radially increased beyond that of the inlet opening.

The weight 51 will normally be set for the pressure arising from the demand in the outlet main, into which the opening 9 leads, and my improvement will thus effect delicate responsive movement of the diaphragm resulting from high demand.

It is evident that the details of construction and arrangements of parts may be varied without departing from the spirit of my invention, and therefore my invention is not to be thus limited to the exact preferred form herein illustrated, but only in so far as defined by the scope and spirit of the appended claims.

What I claim and desire to secure by Letters Patent, is:—

1. In pressure regulators the combination with a valve casing of the bridge wall type formed with inlet and outlet ports and having a central opening in its upper wall and a vertical aperture adjacent said outlet port, of a valve mounted on the bridge wall, a diaphragm casing mounted on said valve casing and having a reduced guide aperture in its lower section registering axially with said central opening, and a lateral wall aperture, control means for said valve including a diaphragm in said diaphragm casing above said lateral wall aperture, the said diaphragm being responsive to pressure therebeneath, stem means movable through said guide aperture operatively connecting said diaphragm and valve, a tubular stem mounted in said vertical aperture of the valve casing and extending through the latter aperture and into the casing to a point spaced from the bridge wall and in a plane common with the inner end of said outlet port, and a detachable tubular connection between said tubular stem and said lateral wall aperture.

2. In pressure regulators the combination with a valve casing formed with aligned inlet and outlet ports and having in its upper wall a central opening and a vertical aperture adjacent said outlet port, of a valve mounted in said casing, a diaphragm casing mounted on said valve casing and having a reduced guide aperture in its lower section registering axially with said central opening and a lateral wall aperture, control means for said valve including a diaphragm in said diaphragm casing above said lateral wall aperture and responsive to pressure therebeneath, stem means movable through said guide aperture in said diaphragm casing operatively connecting said diaphragm and valve, the said outlet port being frusto-conical in form having its larger opening directed inward, a tubular stem mounted in said vertical aperture of the valve casing and extending inwardly of the latter to a point in the axis of said outlet port, and in the center of the inner end of the latter, while the lower point of said stem is laterally spaced from the bridge wall to increase the effective suction through said tubular stem, there being a tubular connection between the upper end of the said stem and said diaphragm casing.

RALPH C. HUGHES.